US012594726B2

(12) United States Patent
Gonzalez Martin et al.

(10) Patent No.: US 12,594,726 B2
(45) Date of Patent: Apr. 7, 2026

(54) DETERMINING WHETHER USING BUILD DATA WILL RESULT IN GENERATING AN OBJECT WITH A GENERATION DEFECT

(71) Applicant: Peridot Print LLC, Palo Alto, CA (US)

(72) Inventors: Sergio Gonzalez Martin, Sant Cugat del Valles (ES); Alex Carruesco Llorens, Sant Cugat del Valles (ES); Jordi Roca Vila, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 313 days.

(21) Appl. No.: 18/033,336

(22) PCT Filed: Nov. 11, 2020

(86) PCT No.: PCT/US2020/060121
§ 371 (c)(1),
(2) Date: Apr. 22, 2023

(87) PCT Pub. No.: WO2022/103393
PCT Pub. Date: May 19, 2022

(65) Prior Publication Data
US 2023/0391013 A1     Dec. 7, 2023

(51) Int. Cl.
*B29C 64/386* (2017.01)
*B33Y 50/02* (2015.01)

(52) U.S. Cl.
CPC ............ *B29C 64/386* (2017.08); *B33Y 50/02* (2014.12)

(58) Field of Classification Search
CPC ..... B29C 64/386; B29C 64/165; B33Y 50/02; B33Y 10/00; B33Y 50/00; B22F 10/85; G06F 30/20; G06F 2113/10; G06F 30/10
See application file for complete search history.

(56) References Cited

U.S. PATENT DOCUMENTS

| | | | |
|---|---|---|---|
| 2011/0087350 A1* | 4/2011 | Fogel | G06T 19/00 700/98 |
| 2013/0300736 A1* | 11/2013 | Schmidt | G06T 19/20 345/419 |
| 2014/0031967 A1 | 1/2014 | Unger et al. | |
| 2015/0154321 A1 | 6/2015 | Schmidt et al. | |
| 2015/0269290 A1 | 9/2015 | Nelaturi et al. | |
| 2015/0363665 A1* | 12/2015 | Szasz | H04N 13/204 382/203 |

(Continued)

FOREIGN PATENT DOCUMENTS

| | | |
|---|---|---|
| CN | 110509545 A | 11/2019 |
| WO | 2017/194072 A1 | 11/2017 |

(Continued)

*Primary Examiner* — Yuhui R Pan
(74) *Attorney, Agent, or Firm* — Michael Dryja

(57) ABSTRACT

A method comprises: determining, from build data comprising one or more build elements each of which is a representation of a portion of an object of one or more objects to be generated by an additive manufacturing system, a property of at least one build element of the one or more build elements; and determining, based on the property of the at least one build element, whether generating the one or more objects using the build data would result in generating the object with a generation defect.

15 Claims, 5 Drawing Sheets

(56) References Cited

U.S. PATENT DOCUMENTS

| | | | |
|---|---|---|---|
| 2016/0059489 A1 | 3/2016 | Wang et al. | |
| 2017/0083003 A1 | 3/2017 | Arisoy et al. | |
| 2017/0129184 A1 | 5/2017 | Buller et al. | |
| 2018/0033193 A1 | 2/2018 | Goel et al. | |
| 2021/0085480 A1* | 3/2021 | Cain | A61F 2/4425 |

FOREIGN PATENT DOCUMENTS

| | | | | |
|---|---|---|---|---|
| WO | WO-2020027792 A1 * | 2/2020 | | B33Y 50/00 |
| WO | 2020/159508 A1 | 8/2020 | | |

* cited by examiner

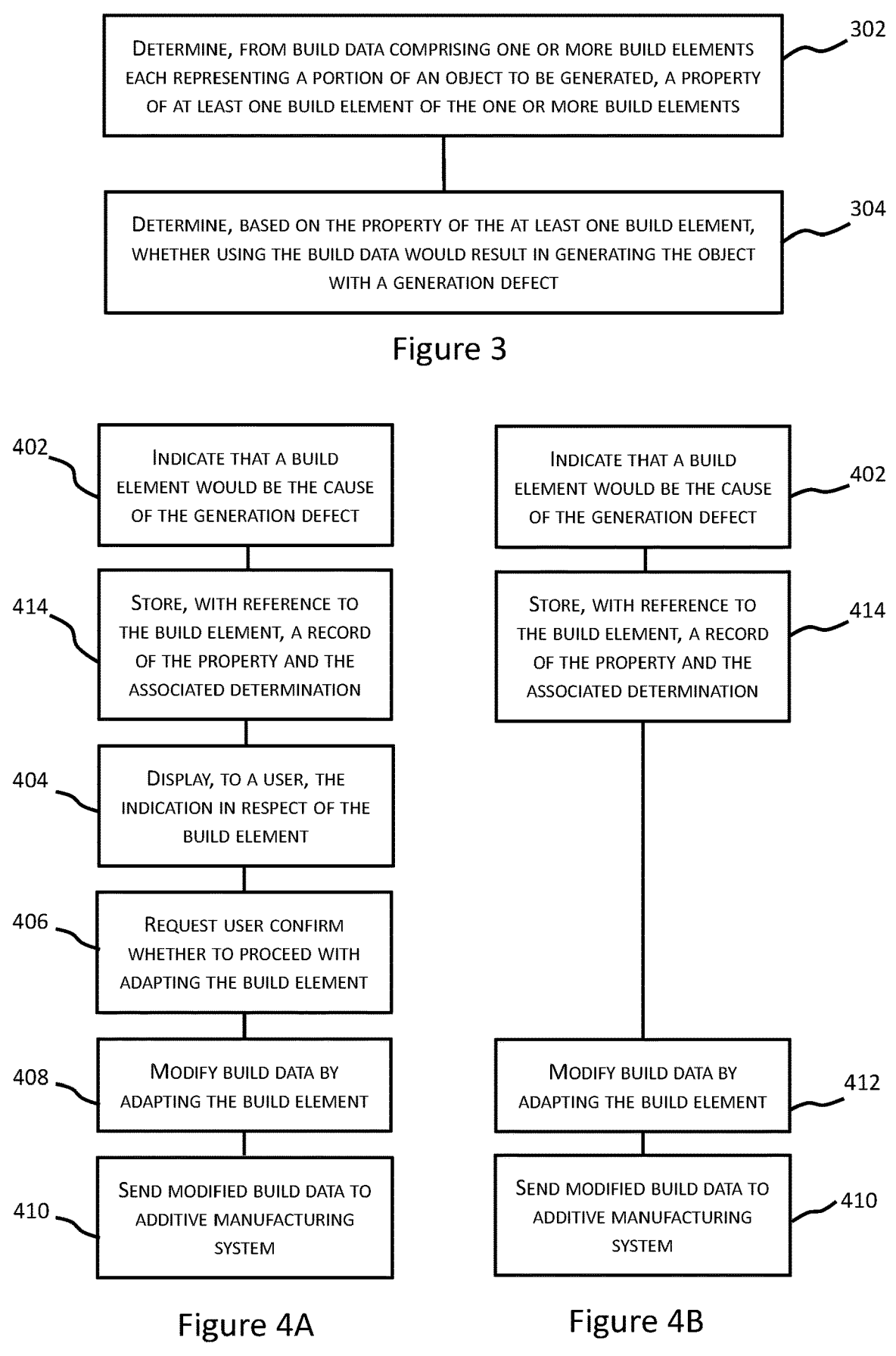

DETERMINE, FROM BUILD DATA COMPRISING ONE OR MORE BUILD ELEMENTS EACH REPRESENTING A PORTION OF AN OBJECT TO BE GENERATED, A PROPERTY OF AT LEAST ONE BUILD ELEMENT OF THE ONE OR MORE BUILD ELEMENTS ⟩302

DETERMINE, BASED ON THE PROPERTY OF THE AT LEAST ONE BUILD ELEMENT, WHETHER USING THE BUILD DATA WOULD RESULT IN GENERATING THE OBJECT WITH A GENERATION DEFECT ⟩304

Figure 3

402⟩ INDICATE THAT A BUILD ELEMENT WOULD BE THE CAUSE OF THE GENERATION DEFECT

414⟩ STORE, WITH REFERENCE TO THE BUILD ELEMENT, A RECORD OF THE PROPERTY AND THE ASSOCIATED DETERMINATION

404⟩ DISPLAY, TO A USER, THE INDICATION IN RESPECT OF THE BUILD ELEMENT

406⟩ REQUEST USER CONFIRM WHETHER TO PROCEED WITH ADAPTING THE BUILD ELEMENT

408⟩ MODIFY BUILD DATA BY ADAPTING THE BUILD ELEMENT

410⟩ SEND MODIFIED BUILD DATA TO ADDITIVE MANUFACTURING SYSTEM

INDICATE THAT A BUILD ELEMENT WOULD BE THE CAUSE OF THE GENERATION DEFECT ⟩402

STORE, WITH REFERENCE TO THE BUILD ELEMENT, A RECORD OF THE PROPERTY AND THE ASSOCIATED DETERMINATION ⟩414

MODIFY BUILD DATA BY ADAPTING THE BUILD ELEMENT ⟩412

SEND MODIFIED BUILD DATA TO ADDITIVE MANUFACTURING SYSTEM ⟩410

Figure 4A          Figure 4B

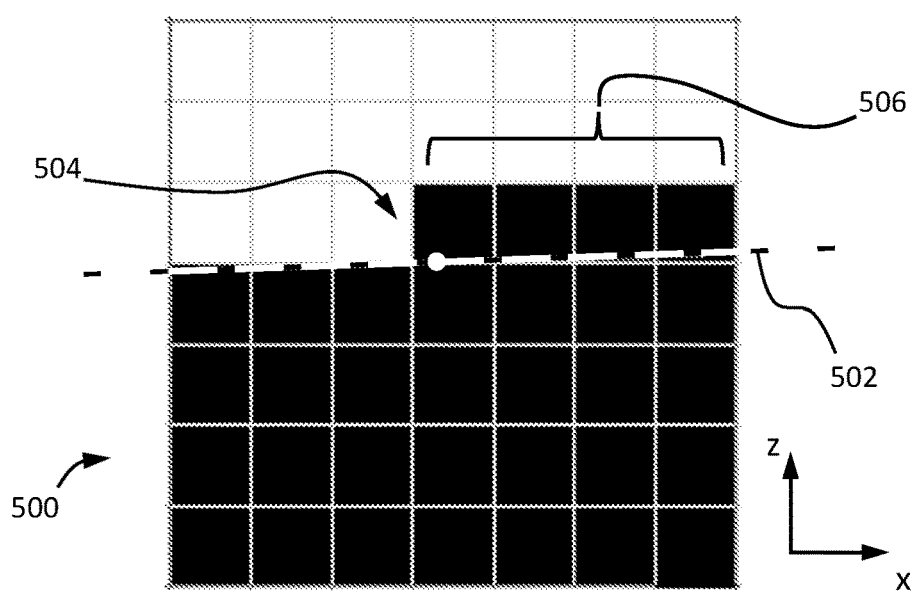
Figure 5
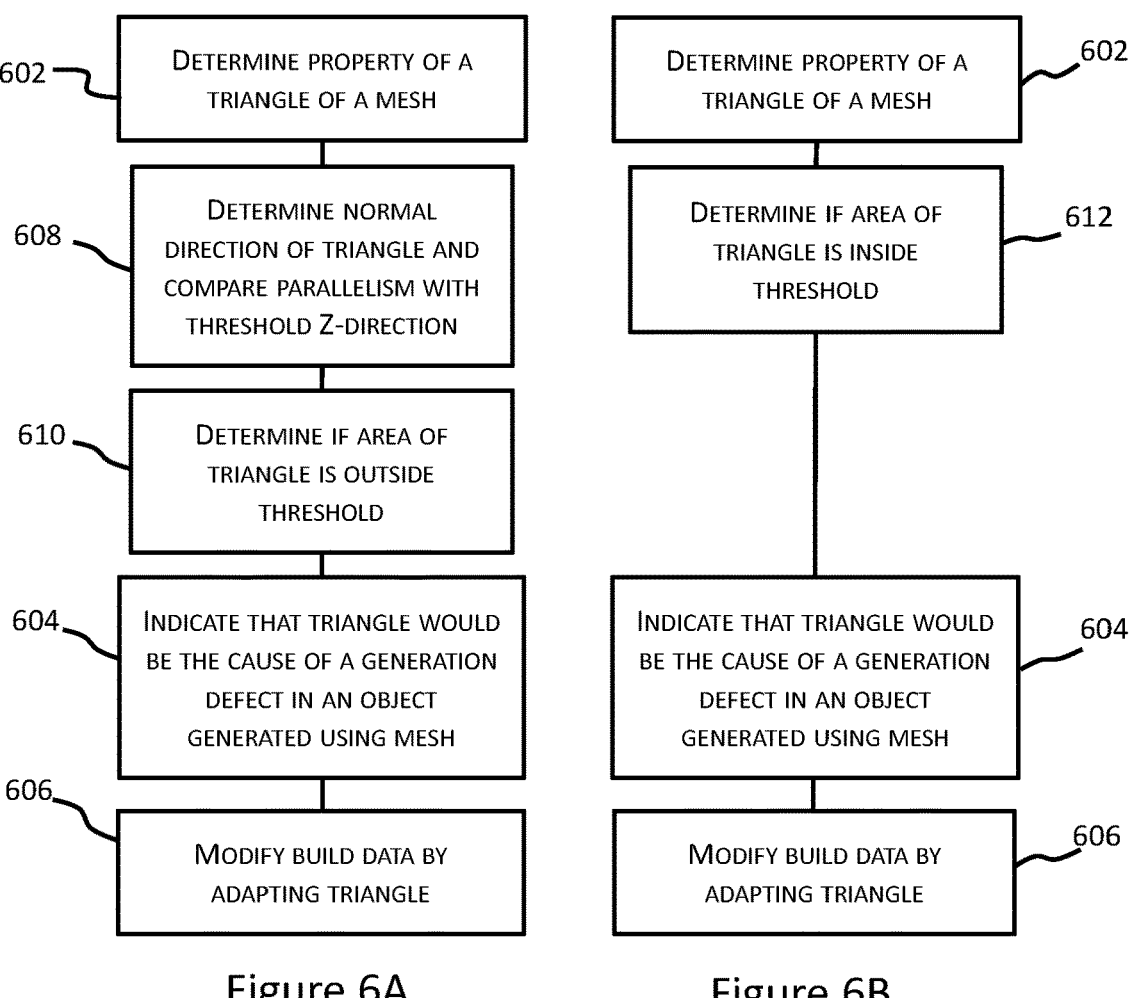
Figure 6A                    Figure 6B

702

704

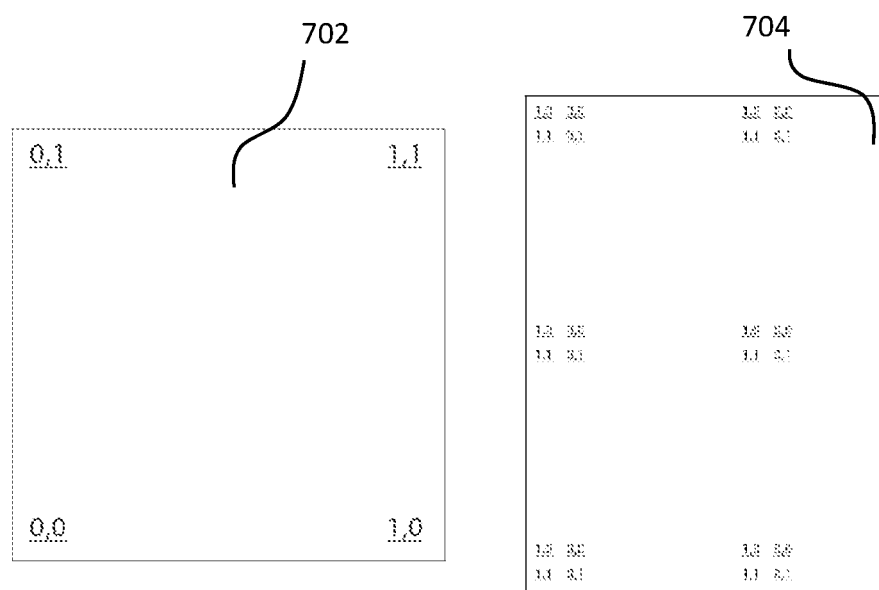

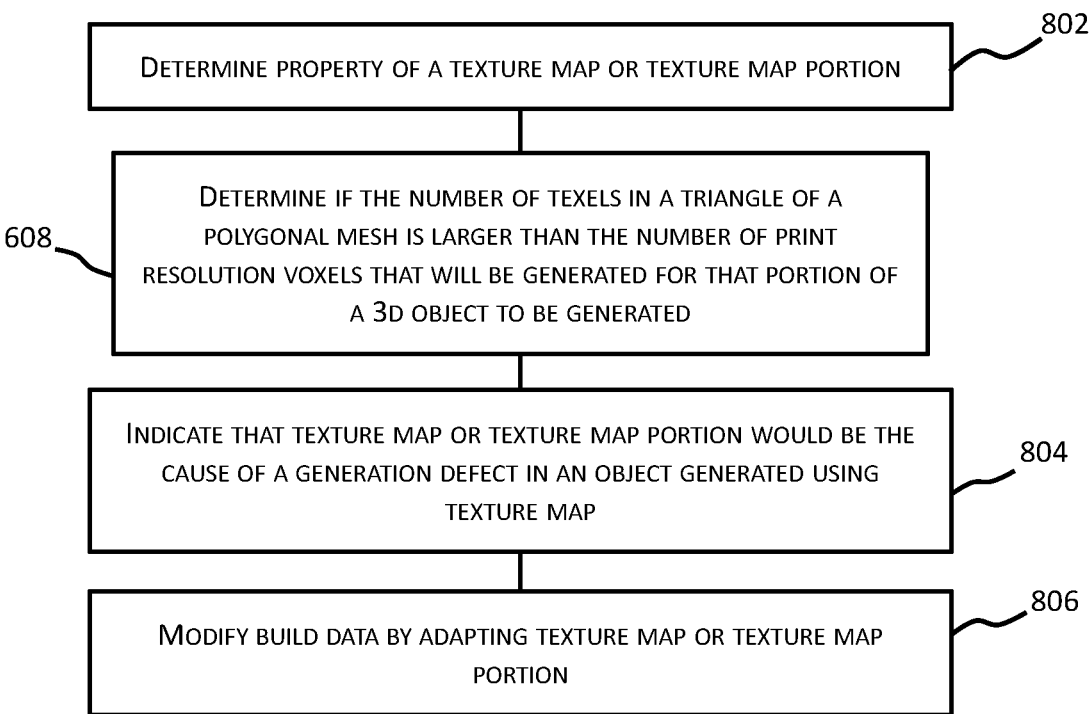

| 802 |
| DETERMINE PROPERTY OF A TEXTURE MAP OR TEXTURE MAP PORTION |

608

DETERMINE IF THE NUMBER OF TEXELS IN A TRIANGLE OF A POLYGONAL MESH IS LARGER THAN THE NUMBER OF PRINT RESOLUTION VOXELS THAT WILL BE GENERATED FOR THAT PORTION OF A 3D OBJECT TO BE GENERATED

INDICATE THAT TEXTURE MAP OR TEXTURE MAP PORTION WOULD BE THE CAUSE OF A GENERATION DEFECT IN AN OBJECT GENERATED USING TEXTURE MAP

804

MODIFY BUILD DATA BY ADAPTING TEXTURE MAP OR TEXTURE MAP PORTION

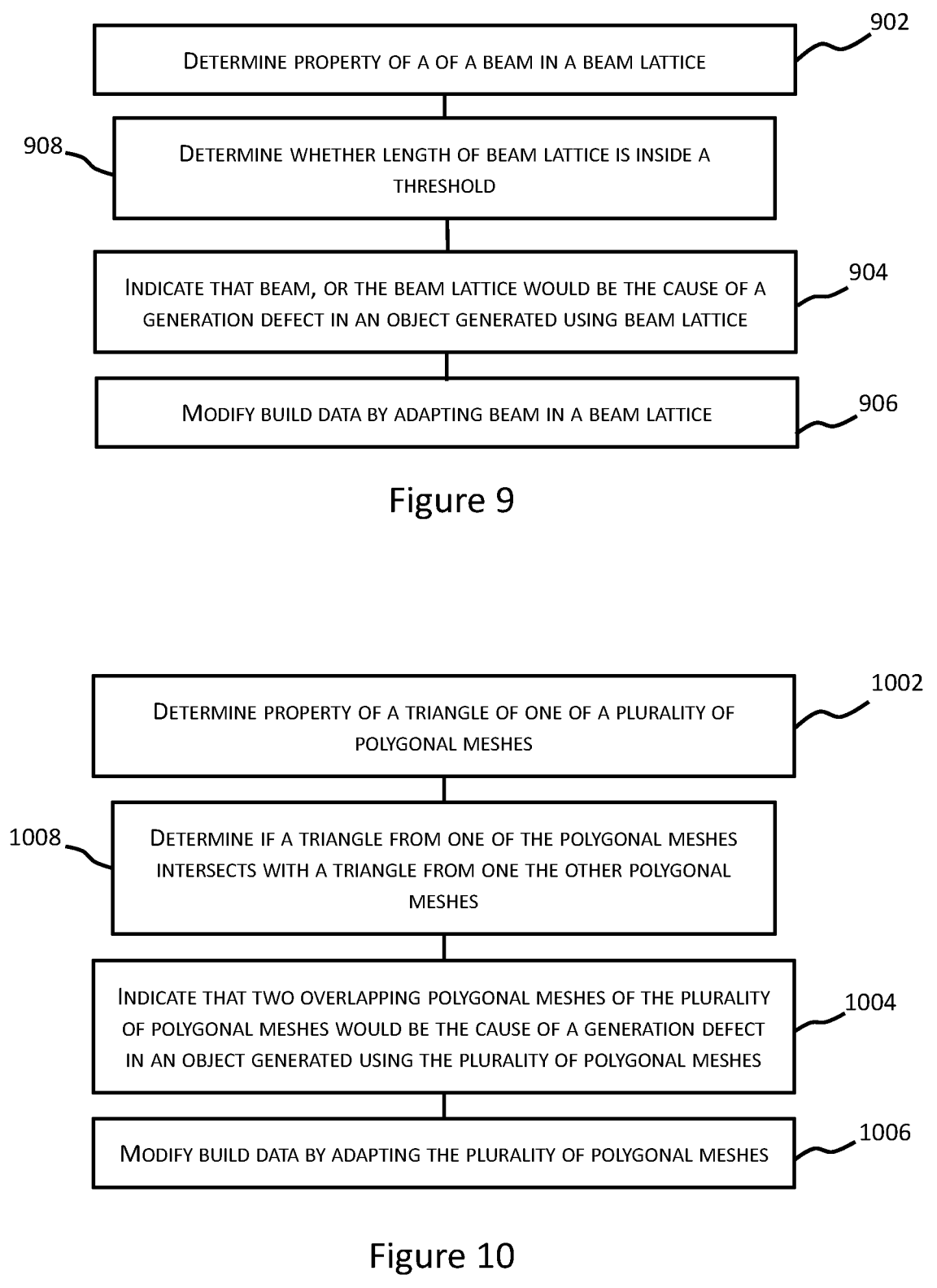

DETERMINE PROPERTY OF A OF A BEAM IN A BEAM LATTICE

908

DETERMINE WHETHER LENGTH OF BEAM LATTICE IS INSIDE A THRESHOLD

904

INDICATE THAT BEAM, OR THE BEAM LATTICE WOULD BE THE CAUSE OF A GENERATION DEFECT IN AN OBJECT GENERATED USING BEAM LATTICE

906

MODIFY BUILD DATA BY ADAPTING BEAM IN A BEAM LATTICE

DETERMINE PROPERTY OF A TRIANGLE OF ONE OF A PLURALITY OF POLYGONAL MESHES

1008

DETERMINE IF A TRIANGLE FROM ONE OF THE POLYGONAL MESHES INTERSECTS WITH A TRIANGLE FROM ONE THE OTHER POLYGONAL MESHES

1004

INDICATE THAT TWO OVERLAPPING POLYGONAL MESHES OF THE PLURALITY OF POLYGONAL MESHES WOULD BE THE CAUSE OF A GENERATION DEFECT IN AN OBJECT GENERATED USING THE PLURALITY OF POLYGONAL MESHES

1006

MODIFY BUILD DATA BY ADAPTING THE PLURALITY OF POLYGONAL MESHES

Figure 10

DETERMINING WHETHER USING BUILD DATA WILL RESULT IN GENERATING AN OBJECT WITH A GENERATION DEFECT

BACKGROUND

Additive manufacturing systems, including those commonly referred to as '3D printers', build objects from selective addition of build material. In some examples, an object may be generated by solidifying or fusing portions of layers of build material, which may be in the form of a liquid, a slurry or a powder. Solidification may be achieved, for example, by thermal fusing, irradiation, sintering, or binding.

The additive manufacturing systems may receive a definition of the object to be generated in the form of data defining a three-dimensional model, or data derived therefrom.

BRIEF DESCRIPTION OF THE DRAWINGS

Various features of the present disclosure will be apparent from the detailed description which follows, taken in conjunction with the accompanying drawings, which together illustrate features of the present disclosure, and wherein:

FIG. 3 is a flow chart of an example method of determining whether using build data will result in generating a 3D object with a generation defect.

FIG. 4A is a flow chart of an example method of indicating that a build element would cause a generation defect and modifying build data by adapting the build element.

FIG. 4B is a flow chart of an example method of indicating that a build element would cause a generation defect and modifying build data by adapting the build element.

FIG. 5 is a schematic diagram of an example cross-section through a X-Z plane of a build volume.

FIG. 6A is a flow chart of an example method of determining whether a build element comprising a triangle of a polygonal mesh would cause a generation defect and modifying build data by adapting the triangle.

FIG. 6B is a flow chart of an example method of determining whether a build element comprising a triangle of a polygonal mesh would cause a generation defect and modifying build data by adapting the triangle.

FIG. 7A is a schematic diagram of an example of a texture that may be mapped to a portion of a 3D model representing a 3D object.

FIG. 7B is a schematic diagram of an example of a texture mapped onto a portion of a generated 3D object.

FIG. 8 is a flow chart of an example method of determining whether a build element comprising a texture map would cause a generation defect and modifying build data by adapting the texture map.

FIG. 9 is a flow chart of an example method of determining whether a build element comprising a beam in a beam lattice would cause a generation defect and modifying build data by adapting the beam.

FIG. 10 is a flow chart of an example method of determining whether a build element comprising a triangle of one mesh from a plurality of polygonal meshes would cause a generation defect and modifying build data by adapting the triangle.

DETAILED DESCRIPTION

Figure 1:
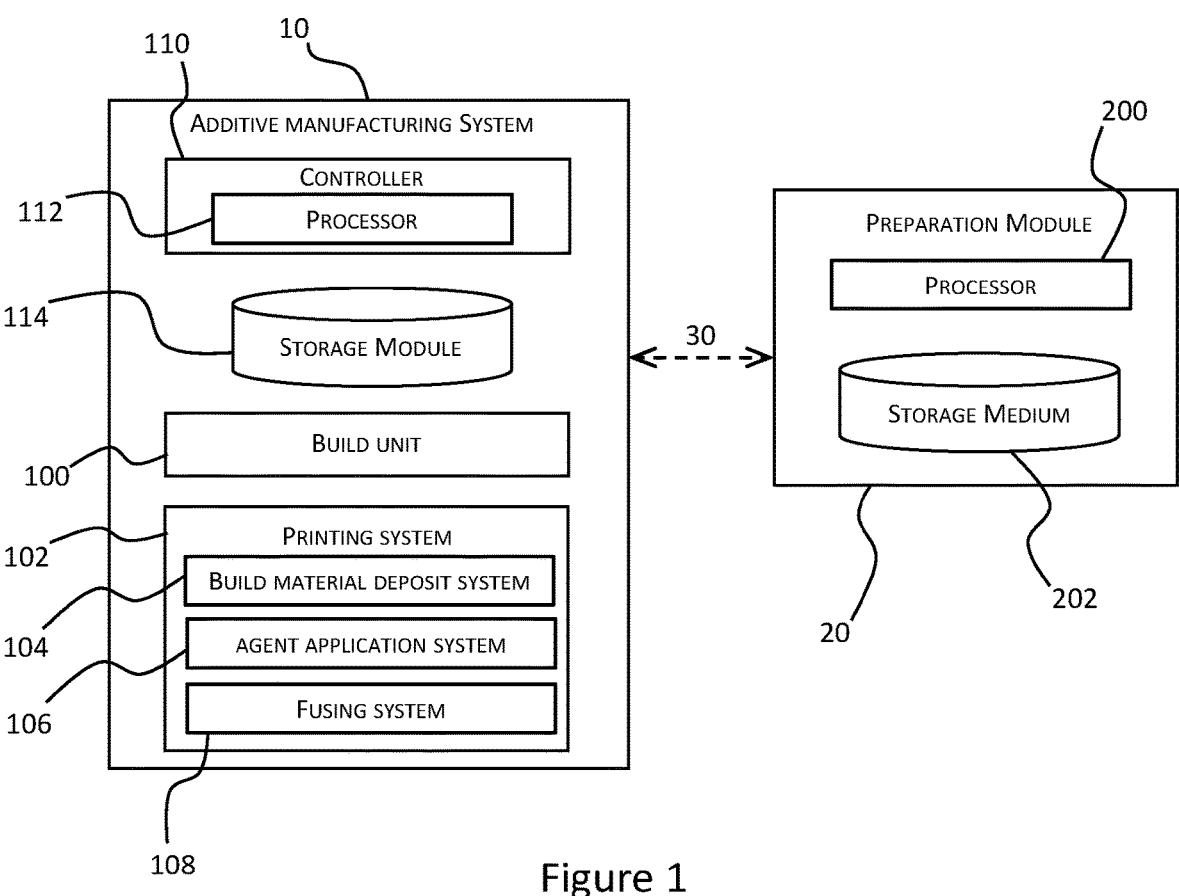
FIG. 1 is a schematic diagram of an example additive manufacturing system and a preparation module.

Three-dimensional (3D) objects can be generated using additive manufacturing techniques.

In certain additive manufacturing techniques, the objects may be generated using fused deposition modeling (FDM) where a molten build material is extruded from a movable nozzle to build the 3D object. The nozzle is moved in two-dimensions as the molten build material is forced through the nozzle such that the 3D object is build up by depositing a molten filament of the build material layer-by-layer.

In certain additive manufacturing techniques, one or more 3D objects may be generated by solidifying portions of successive layers of build material. The portions of build material to be solidified on each layer may be determined by solidification areas mapped out on each layer of build material. In some examples, the build material may be powder-based and the material properties of generated objects may be dependent on the type of build material and the type of solidification. For example, various plastic powder types can be used as the raw build material. In other examples, metal powders or ceramic powders may be used. In other examples, other build materials may be used. In certain examples, the build material includes paste material, slurry material or liquid material. In certain additive manufacturing systems, the build material may be changed between builds. The successive layers of build material may be deposited, in some examples, on a build platform within a fabrication chamber for processing layer-by-layer to generate a body that includes the solidified 3D object(s) and unsolidified build material.

In certain examples, solidification of the build material may be enabled by temporary application of energy to selected portions of the build material. The applied energy may, for example, cause the selected portions of the build material to melt or soften, and then re-solidify such that the particles of the build material stick together. In some examples, the particles of the build material may be sintered together.

In some examples, selective solidification is achieved through directional application of energy, for example using a laser or electron beam which results in solidification of build material where the directional energy is applied. In other examples, a functional agent, such as a fusing agent, is applied to the build material. In certain examples, a fusing agent is a material that, when a suitable amount of energy is applied to a combination of the build material and the fusing agent, causes the build material to heat up sufficiently to melt, coalesce, sinter, or otherwise fuse, and to solidify upon cooling. In certain examples, the applied fusing agent may define the solidification areas of a layer of build material, which correspond to the portions of a layer of build material that are to be solidified. In certain examples, in addition to a fusing agent, another functional agent, such as a detailing agent, is applied to the build material. In one example, a detailing agent may be arranged to absorb thermal energy and may be selectively applied to a layer of build material to control the solidification of the build material by inhibiting, reducing or increasing fusing or to assist in producing a certain finish or appearance to a 3D object. For example, a detailing agent may be applied to reduce fusing at an object boundary to produce a part with distinct and smooth edges. In certain examples, a property modification agent, for example comprising a dye, colorant, a conductive agent, an elastomeric agent, or the like, may be used as a fusing agent, detailing agent, or another functional agent to provide a property for the 3D object. In some examples, the fusing agent and/or detailing agent may be liquids that are applied to the layer of build material. In some examples, the fusing agent and/or detailing agent may be printed on the build material. In one example, the fusing agent and/or detailing agent may be printed onto the layer of build material by jet nozzles.

Additive manufacturing systems may comprise different units. In certain examples, an additive manufacturing system may comprise a controller. The controller may comprise at least one processor. In certain examples, the additive manufacturing system may comprise one or more storage modules encoded with instructions executable by the at least one processor. In certain examples, the controller may comprise the one or more storage modules.

In certain examples, an additive manufacturing system may comprise a build unit. The build unit may comprise a build platform that provides a working area on which one or more 3D objects may be generated. The build platform may be contained within a fabrication chamber. The fabrication chamber and/or the build platform may define a build volume that is the complete volume available for generating the one or more 3D objects. The build platform and/or the build volume may be referenced by a three-dimensional coordinate system, for example, a cartesian coordinate system. For example, the build platform may extend in the X-direction and the Y-direction such that each layer of build material is deposited in an X-Y plane. The build platform may be movable in a three-dimensional space. For example, the build platform may be movable in the Z-direction to allow a plurality of build layers to be built thereon. The build volume may extend in the in the X-direction, Y-direction, and the Z-direction. In certain examples, the build unit may be a component that is separate from the remaining components of the additive manufacturing system. For instance, the build unit may be a removable or interchangeable unit that is separate from the controller. For example, the build unit may be interchangeable with other build units which have different operating parameters, such as being to build with different build materials. In an example, the build unit may be interchangeable with another build unit so that further 3D objects can be built as the first used build unit is removed for post-processing.

In certain examples, an additive manufacturing system may comprise a printing system. In certain examples, the printing system may be a separate component of the additive manufacturing system. For example, the printing system may be a removable or interchangeable system that is separate from the build unit. For example, the printing system may be interchangeable with other printing systems which have different operating parameters, such as being to deposit a different range of materials. In certain examples, the printing system may comprise a build material deposit system for depositing or otherwise forming a layer of build material on the build platform. The deposited layer of build material may be of a certain thickness. For example, the build platform may be movable incrementally in the Z-direction in which each incremental movement may, at least partially, determine the thickness of the deposited layer and, in certain examples, partly define the capable Z-direction resolution of the additive manufacturing system. In some examples, the build material deposit system may be a separate unit in the additive manufacturing system. A build material store may contain build material from which an object may be built. In certain examples, the build unit may comprise the build material store. The printing system may comprise a functional agent application system to apply functional agent(s) to a layer of build material, such as any of the functional agents described herein. In certain examples, an additive manufacturing system may comprise a fusing system. In certain examples, the printing system may be integrated with the fusing system in an additive manufacturing system.

It should be understood that an additive manufacturing system may comprise all of, or some of, or one of, the units, modules, components, and/or systems described herein. For example, an additive manufacturing system comprising a controller and a printing system may be supplied to a user separately from a build unit. Such an additive manufacturing system may be to operate with a range of different build units, for example. In an example, the additive manufacturing system comprising the controller having a storage module encoded with executable instructions, as described further below, may be supplied to a user separately a printing system, and/or a build unit.

Additive manufacturing systems, such as those described above, may generate, or build, one or more 3D objects based on build data. Initially, a designer may generate a 3D model of a 3D object that is to be generated, for example by using a computer aided design (CAD) application. The 3D model may comprise 3D model data that defines solid portions, or other characteristics, of the object. To generate the object, the 3D model may be included in a 3D print job that is prepared for use in an additive manufacturing system. The 3D print job defines the spatial arrangement within the build volume of one or more 3D objects to be generated by the additive manufacturing system.

The 3D print job may be prepared by arranging one or more 3D models spatially in a model space representing the build volume and taking account of, for example, the desired object build orientations in the build volume, build material properties, or build material waste minimization. In certain examples, the preparation of the 3D print job involves manipulating the 3D model data of the one or more 3D models by, for example, using scaling, translating, or rotating transformation matrices on the 3D model data. The transformations may, for example, take account of the actual dimensional limits of the build volume, which will depend on the build platform and/or the fabrication chamber of a selected additive manufacturing system.

The prepared 3D print job comprises build data that defines the one or more 3D objects to be generated. For example, the build data may represent the geometry or other characteristics, such as colour, of the one or more 3D objects to be generated. For instance, the build data may define solid portions of the one or more 3D objects. In another example, the build data may define the colour or appearance of the one or more 3D objects. The build data comprises one or more build elements that are each a representation of a portion of the 3D object or 3D objects to be built by an additive manufacturing system. For instance, each build element may represent a portion of one or other of the one or more 3D objects to be generated. The build elements are portions of data that define a portion of the respective 3D object in a certain manner, such as a solid portion of the 3D object to be generated, for example. For instance, the build elements each contribute to describing the form, structure, or likeness of a portion of the respective 3D object. In certain examples, the build elements can define geometries, surface colour information, internal beam lattices, surface displacement maps, or volumetric information of an object. For instance, one build element of the build data may be a triangle of a triangular mesh that is a representation of a volume of a 3D object to be generated. In another example, one build element of the build data may comprise one vertex, or a set of vertices, partly defining a triangular mesh. In another example, one build element of the build data may comprise a colour specification for a portion of the build volume.

In certain examples, the 3D print job may comprise slice data that is generated by processing the build data to generate slices of parallel planes of the model space representing the build volume. Each slice is a representation of a respective layer of build material that is to be processed by the additive manufacturing system. Each slice is thus a representation of portions to be solidified of a layer of build material that is to be formed on the build platform of an additive manufacturing system. In certain examples, each slice may define a pattern in which functional agents, such as the examples described above, may be selectively applied to a respective layer of build material. In certain examples, the build data comprises the slice data. In certain examples, the slice data of the build data may comprise one or more build elements that are each a representation of a portion of a 3D object on a particular layer of build material to be formed by the additive manufacturing system. For example, one build element of the build data may be a polygon that is a representation of a 2D contour defining a border of a portion of a layer of build material that is to be solidified during processing of that layer by the additive manufacturing system. In certain examples, one build element of the slice data of the build data may define one voxel generated from a voxelization process in which a 2D raster image representing a processed layer of build material is produced. For example, the 2D raster image may represent, or map out, voxels of a layer of build material to be processed in the X-Y plane on a build platform. Once processed, the voxel may define the colour and density of a portion of the generated object, for instance.

In some examples, the 3D print job may comprise the build data defining the one or more 3D objects to be generated packaged together with additional build data comprising the slice data. In other examples, since the original build data comprising the slice data can be large, the 3D print job may have the build data defining the one or more 3D objects to be generated removed to reduce the size of the 3D print job. In another example, the build data comprising the slice data can be exported as a separate 3D print job without the original build data defining the one or more 3D objects to be generated.

A preparation module may be used to prepare a 3D print job for use in an additive manufacturing system. The preparation module may comprise a processor for executing encoded instructions. The preparation module may be connected to a storage medium. The storage medium may be encoded with instructions executable by the processor. In some examples, the storage medium may be a separate unit from the preparation module. In some examples, the storage medium may be integrated into the preparation module. The executable instructions may allow a user to prepare a 3D print job as described herein, for example, by manipulating the 3D model data of one or more 3D models.

In certain examples, the preparation module may be separate from an additive manufacturing system. For instance, the preparation module may be connected, or connectable, to the additive manufacturing system via a network connection, for example, or, in another example, via the internet. The preparation module may be to transmit the prepared 3D print job to the additive manufacturing system through the connection. In some examples, the preparation module may comprise a computing device connected, or connectable, to the additive manufacturing system.

In certain examples, the preparation module may be included in an additive manufacturing system. For example, the preparation module may be included as a separate unit of the additive manufacturing system. In some other examples, the preparation module may be integrated with the controller of the additive manufacturing system. For example, the processor of the controller may perform the functions of the performance module processor. In some examples, the executable instructions allowing a user to prepare a 3D print job may be encoded on one or more storage modules of the additive manufacturing system. A user may thereby prepare a 3D print job as described above using the additive manufacturing system.

An example of an additive manufacturing system 10 is shown in FIG. 1 and comprises a build unit 100, a controller 110, and a storage module 114. The controller 110 comprises a processor 112. In some examples, the controller 110 comprises the storage module 114. The storage module 114 is be encoded with instructions executable by the processor 112. In certain examples, the additive manufacturing system 10 comprises a printing system 102. In the example shown, the printing system 102 comprises a build material deposit system 104. The printing system 102 comprises a functional agent application system 106 to apply functional agent(s) to a layer of build material. For example, the functional agent application system 106 may comprise a set of printheads with nozzles that fire the functional agent(s) onto the layer of build material. The functional agent(s) may be any of the functional agents described herein. In the example shown, the printing system 102 may comprise a fusing system 108 to temporarily apply energy to a layer of build material deposited on a build platform of the build unit 100.

FIG. 1 also shows an example preparation module 20 on which a 3D print job may be prepared as described herein. The preparation module 20 comprises a processor 200 for executing encoded instructions. In the example shown in FIG. 1, the preparation module comprises a storage medium 202 that is encoded with instructions executable by the processor 200. It should be understood that, in other examples, the storage medium may be separate from, or removable from, the preparation module 20.

The preparation module 20 is connected, or connectable, to the additive manufacturing system 10 via a connection 30. The preparation module may be to transmit a prepared 3D print job to the additive manufacturing system 10 through the connection 30. In other examples, as described herein, the preparation module 20 may be a unit of the additive manufacturing system 10.

A 3D print job comprising build data is packaged in a computer file format suitable for use with a selected additive manufacturing system. For instance, the preparation module may be used import and/or generate the build data and package it in a suitable file for use in the additive manufacturing system. In certain examples, the 3D print job comprising build data may be packaged in format that is based on the 3D Manufacturing Format (3MF) standard. However, it should be understood that the 3D print job comprising build data may be packaged in another suitable file format. The 3D print job comprising build data may be prepared from a 3D model comprising 3D model data that is packaged in a computer file format such as, for example, a 3MF file.

An additive manufacturing system, such as those described herein, should be able to generate one or more 3D objects that conform to a desired standard when a valid 3D model is used to prepare the 3D print job, for example as described above. A valid 3D model may, for example, be defined as one that has no deficiencies in the elements that define the object. For example, a 3D model may comprise a polygonal mesh that defines the solid volume of the 3D object. The 3D model may be validated by checking, for example, whether the polygonal mesh contains any holes, edges of neighbouring polygons that do not meet as expected, or intersecting polygonal faces. Irregularities such as these can be mended in the 3D model before the 3D model is used to prepare a 3D print job.

The 3D print job may also be considered to be valid if, for example, it has no deficiencies in the build elements that define the 3D object or 3D objects to be generated, such as a solid portion of an object to be generated. The 3D print job may have been validated by reviewing, for example, the polygonal mesh for holes or invalid polygonal intersections. However, in some circumstances, even where the 3D models or 3D print jobs are considered valid, generating objects from the build data of a 3D print job prepared for an additive manufacturing system can still yield unexpected and undesirable results in respect of the quality or finish of the generated 3D object. These unexpected results, some of which are described herein, may be a result of the limitations of the selected additive manufacturing system when compared with the desired quality of the originally envisioned 3D object, for example as expected by the designer of the 3D object, who created the 3D model. The selected additive manufacturing system may not necessarily be known at the time the 3D model, or even the 3D print job, is produced. Thus, whilst the 3D model(s) that was/were included in the 3D print job does/do not exhibit any deficiencies, the generation of one or more 3D objects from the build data of the 3D print job can still produce generation defects in the object(s) due to individual limitations or inherent capabilities of the additive manufacturing system in which the 3D print job is used. For example, an initial 3D print job may be prepared before a particular additive manufacturing system is selected to generate one or more 3D objects represented by the build data of the 3D print job. In some examples, the slice data may have been prepared before the selection of the additive manufacturing system.

The only way to presently determine if a 3D object that is generated from the build data of a 3D print job has any quality issues arising from a mismatch between the 3D print job and the production capabilities of the chosen additive manufacturing system is to proceed with generating the 3D object(s). Proceeding in this manner is expensive in terms of consuming resources—such as time, labor, and machine capacity—in generating an object that may be of no use. It is also wasteful in terms of consuming materials that may be effectively discarded.

Figure 2:
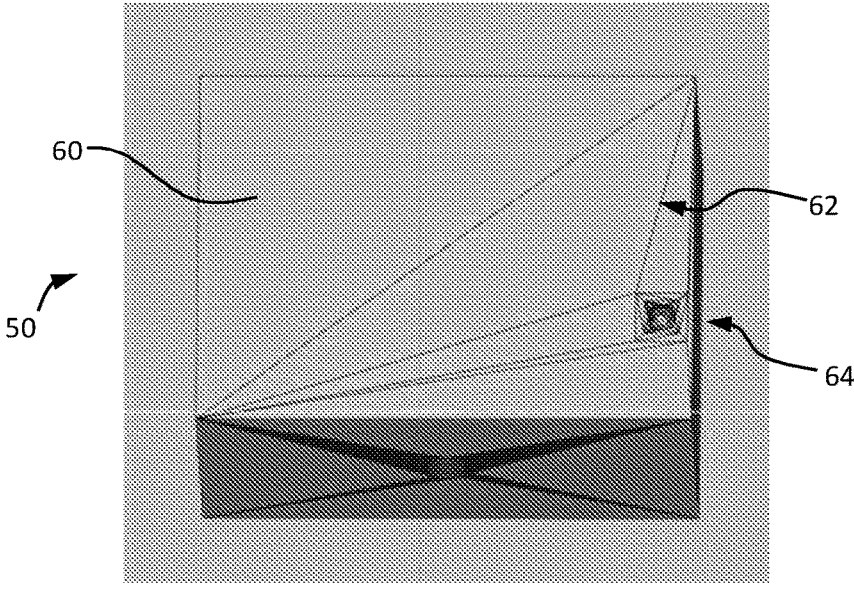
FIG. 2 illustrates a 3D model of an object to be generated in an additive manufacturing system.

An illustration of the type of generation defects that can occur in generated 3D objects can be seen in FIG. 2, which shows a 3D model 50 including a triangular mesh 60 that represents the volume of a 3D object to be generated in an additive manufacturing system. When included in a print job, the build data also comprises a polygonal mesh, such as the triangular mesh shown in FIG. 2, that defines the solid portions of the 3D object. In this example, one build element of the build data is a triangle 62, the face of which is oriented so closely to the X-Y plane of the build platform that a triangular shape is visible in a portion of the generated object. Such a result is considered to be an undesirable generated defect. In another example illustrated in FIG. 2, a blind hole 64 is intended to be generated in the object. Some of the triangles, or build elements, defining this portion of the object are, in this instance, too small to be generated acceptably by the printing system of the chosen additive manufacturing system—for example, due to resolution issues—and the small triangles may lead to computational errors that cause discontinuities between neighbouring triangles when the build data is used to generate the 3D object. Further examples are discussed below.

The unnecessary costs associated with generation defects may be avoided by implementing any one of the methods described herein. The methods may be implemented in any one of the modules or systems described herein. One example of a method is illustrated in FIG. 3. The method comprises: determining, at block 302, from build data comprising one or more build elements each of which is a representation of a portion of an object of one or more objects to be generated by an additive manufacturing system, a property of at least one build element of the one or more build elements; and determining, at block 304, based on the property of the at least one build element, whether generating the one or more objects using the build data would result in generating the object with a generation defect. The build data may be, for example, the build data of the prepared 3D print job described herein that defines the defines the one or more 3D objects to be generated. The at least one build element may be any of the build elements as described herein. For example, the at least one build element may be a build element that is a representation of a portion of the 3D object or may be a build element that is a representation of a portion of the 3D object on a particular layer of build material to be processed by the additive manufacturing system. Thus, the build elements may be from build data defining the 3D object or comprising slice data.

Whether or not generating the one or more objects using the build data would result in generating the object with a generation defect based on a property of a build element can be determined by evaluating the build element with respect to the specific parameters of the chosen additive manufacturing system in which the build volume is to be built. For example, the Z-direction resolution of the build unit may be compared with a property of the build element, such as the angle between a normal of a triangle of a polygonal mesh and the Z-direction. In another example, the voxel dimensions in the X-Y plane, or the printable voxel planar area of a functional agent, may be compared with a property of the build element, for example a build element that represents a portion of the build volume that is required to be a certain colour. Evaluating the build element may involve, purely for example, evaluating the spatial relationship, size, colour, surface finish, thermal or electrical conductivity, or other material property of a build element relative to certain operating parameters of the selected additive manufacturing system.

In certain examples, determining whether generating the one or more objects using the build data would result in generating the object with a generation defect, based on the property of the at least one build element, may comprise determining that the property does not achieve a pre-determined configuration. For instance, determining that the property does not achieve the pre-determination configuration may involve, purely for example, evaluating the spatial relationship, size, colour, surface finish, thermal or electrical conductivity, or other material property of a build element relative to certain operating parameters of the selected additive manufacturing system. For example, determining that the property does not achieve a pre-determined configuration may comprise determining that the property is inside or outside of a property tolerance window.

FIGS. 4A and 4B illustrate further example methods as described herein but that also include additional blocks. In certain examples, the method may comprise, at block 402, indicating that the at least one build element would be the cause of the generation defect. In certain examples, block 302 may comprise block 402.

In certain examples, as shown in FIG. 4A, the method comprises, at block 404, displaying, to a user of a preparation module, such as any of the preparation modules described herein, an indication that the at least one build element would be the cause of the generation defect. The indication may involve visually displaying the indication on a graphical user interface, for example. For instance, the indication may involve visually identifying the at least one build element on a visual projection of the 3D print job, for example a projection of the model space representing the build volume, or of the 3D model. Visually identifying the at least one build element to a user in this manner should allow the user to make decisions in respect of the indication. In some examples, the method comprises, at block 406, requesting a user to confirm whether to proceed with modifying the build data by adapting the at least one build element. For example, the user may be requested to confirm whether to proceed with modifying the build data by adapting the at least one build element to achieve the pre-determined configuration. Thus, the user can decide whether to ignore or mitigate the generation defect that would be caused by the at least one build element before the 3D object is generated. In one example, the user may decide to proceed with adapting the at least one build element so that the at least one build element will no longer cause the generation defect in the 3D object. In another example, the user may decide that the generation defect would not present a problematic quality issue in an object and elect not to proceed with adapting the at least one build element. The method comprises, at block 408, and in response to a confirmation from the user, modifying the build data by adapting the at least one build element. Modifying the build data may comprise adapting the at least one build element so that the at least one build element does not cause, or at least partially mitigates, the generation defect in the 3D object. In certain examples, modifying the build data may comprise adapting the at least one build element to achieve the pre-determined configuration. In certain examples, adapting the at least one build element comprises reconfiguring the build element to meet the pre-determined configuration. In some cases, additional build elements related to the at least one build element may also require adaptation. One such example may be adapting the triangles that neighbour a triangular build element that is being modified. Adapting the at least one build element results in modified build data for use in the additive manufacturing system. In some examples, the method comprises, at block 410, sending the modified build data to an additive manufacturing system to generate the one or more objects. In other examples, the modified build data may be stored for use at later time. For instance, the modified build data may be stored in the storage medium connected, or connectable, to the preparation module or in another non-transitory machine-readable storage medium.

In certain examples, as shown in FIG. 4B, the method comprises, at block 412, in response to an indication that the at least one build element would be the cause of the generation defect, modifying the build data by adapting the at least one build element. Modifying the build data may comprise adapting the at least one build element so that the at least one build element does not cause the generation defect in the 3D object. In certain examples, modifying the build data may comprise adapting the at least one build element to achieve the pre-determined configuration. In such cases, adapting the at least one build element may occur directly once the indication that the build element would be the cause of the generation defect becomes apparent. For example, a preparation module may be to process build elements of the build data without any intervention by a user of the preparation module. This may be, for example, determined by the user directing the preparation module to proceed in this manner before the preparation module begins processing the build data. In some examples, the method comprises, at block 410, sending the modified build data to an additive manufacturing system to generate the one or more objects. In other examples, the modified build data may be stored for use at a later time.

In certain examples, the method comprises following blocks 402, 404, 406, 408 in respect of some types of build elements, whilst, at the same time, following blocks 402 and 412 on other types of build elements. For instance, a preparation module may be arranged to process some types of build elements of the build data without any intervention by a user of the preparation module and arranged to process other types of build elements of the build data by requesting that the user confirm whether the other types of build elements are to be adapted.

In certain examples, as shown in FIGS. 4A and 4B, the method comprises, at block 414, storing, with reference to the at least one build element, a record of the property and the associated determination for the property. In some cases, the method comprises, following the storing, following blocks 302, 304 and/or 402 on a second build element of the build data and, if necessary, then storing, with reference to the second build element, a record of the property of the second build element and the associated determination of the property. This can be repeated as many times as is necessary until all necessary build elements have been processed. Blocks 404, 406, and 408 can then be followed for the records concerning all the build elements. In this way, all the build elements that would cause a generation defect can be indicated to a user in one session and the user can confirm whether or not to proceed with adapting each identified build element in turn. In other examples, block 412 can then be followed for the records concerning all the build elements.

An example method will now be described with respect to FIGS. 5 and 6. In some examples, the build data of the 3D print job may comprise a polygonal mesh, such as a triangular mesh.

In certain examples, one or more of the triangles forming the mesh may be very close to being flat in one of the reference planes of the additive manufacturing system when the build volume is built layer-by-layer. The triangle may, for example, not be completely flat in the X-Y plane because the Z-direction coordinates of the three vertices of the triangle have slight differences. Similarly, triangles of a mesh may not be completely flat in a X-Z plane or a Y-Z plane. When the representative triangle of the mesh is reproduced in the build process, the triangle may become visible in the generated object, which is an undesirable production quality issue and constitutes a generation defect. FIG. 5 illustrates this in a cross-section through a X-Z plane of a build volume 500. During a voxelization process, which renders individual voxels in a discretization grid to be built in the build unit, and due to a slight inclination of the triangle 502 to the X-Y plane, additional voxels 506 (or an additional voxel) are rendered because the triangle 502 crosses 504 on the discretization grid. The additional voxels 506 are on a subsequent layer of build material and a fraction of the triangle can be visible to an observer of the generated object.

To address this type of generation defect, in certain examples, the property of a triangle of a polygonal mesh is determined. For example, a triangle of the mesh may be analyzed and the normal direction of the triangle face may be determined. For instance, in the standards governing 3MF files, if a triangle has vertices ABC, then the triangle's face normal direction is defined as a unit vector in the direction of the vector cross product $((B-A)\times(C-A))$. In certain examples, the triangle of the mesh may be analyzed, and the area of the triangle may be determined. In certain examples, the property of a triangle of a polygonal mesh may be determined by finding the normal of the triangle and, if the normal direction is almost parallel to the Z-direction (in either direction: (0, 0, 1), or (0, 0, −1)), but not completely parallel, i.e. within a certain parallelism threshold, the area of the triangle is also determined. If the area is deemed large enough, i.e. outside of a size threshold, then it is determined, based on the property, that using the build data would result in generating a 3D object with a generation defect. For instance, the property may be considered to not meet a pre-determined configuration. An indication can then be made that the polygonal mesh would be the cause of generating the 3D object with a generation defect. In certain examples, the triangle of the polygonal mesh, which has been indicated as being the cause of the generation defect, and, in some examples, at the instigation of a user as explained herein, may be adapted so that the polygonal mesh does not cause the generation defect in the 3D object. For example, the polygonal mesh may be adapted to meet the pre-determined configuration. For example, the build data may be modified by flattening the triangle of the mesh so that the face normal direction of the triangle is parallel with the Z-direction. In certain examples, the flattening of the triangle may be achieved by modifying the Z component of the triangle vertices so that they are all the same.

In certain examples, one or more of the triangles forming a polygonal mesh may have an area that is very close to being zero. Triangles with areas close to zero may introduce generation defects into an object because the computation of the face normal directions of the small triangles may be erroneous due to numerical errors, for example, rounding errors. Consequently, face normal discontinuities can be introduced between neighbouring triangles. For example, generation defects can be introduced into computations using the build data that require the face normal directions, such as colour propagation into the interior of a generated object.

To address this type of generation defect, in certain examples, the property of a triangle of a polygonal mesh may be determined by finding the area of the triangle. If the area is deemed smaller than a given threshold, then it is determined, based on the property, that using the build data would result in generating a 3D object with a generation defect. For instance, the property may be considered to not meet a pre-determined configuration. An indication can then be made that the polygonal mesh would be the cause of generating the 3D object generated with a generation defect. In certain examples, the triangle of the polygonal mesh, which has been indicated as being the cause of the generation defect, and, in some examples, at the instigation of a user as explained herein, may be adapted so that the polygonal mesh does not cause the generation defect in the 3D object. For example, the polygonal mesh may be adapted to meet the pre-determined configuration. For example, the build data may be modified by removing the triangle from the polygonal mesh and updating the vertices of the neighbouring triangles to ensure that the mesh is manifold, or watertight, and that no holes have been introduced to the mesh.

As illustrated in FIGS. 6A and 6B, the method at block 302 comprises, in certain examples, at block 602, determining a property of a triangle of a polygonal mesh. In certain examples, where it is determined, based on the property of the triangle, that using the build data would result in generating a 3D object with a generation defect, the method at block 402 comprises, at block 604, indicating that the triangle would be the cause of a generation defect in a 3D object generated by using the build data comprising the polygonal mesh. In certain examples, the method at block 408 comprises, at block 606, modifying the build data by adapting the triangle of the polygonal mesh. In certain examples, it will be understood that block 606 may involve following blocks 404, 406, 408 and/or 412, as described herein. In some examples, block 606 may involve following block 414, as described herein.

In certain examples, as shown in FIG. 6A, the method at block 602 comprises, at block 608 determining a normal direction of a face of the triangle. The normal direction of the face may be compared with the Z-direction to determine the relative parallelism between the normal of the face and the Z-direction and, if the directions are within a parallelism threshold, the method comprises, at block 610, determining an area of the triangle. If the directions are within a parallelism threshold and the area of the triangle is outside of a size threshold, i.e. large enough to be of significance, then block 604 will be followed.

In certain examples, as shown in FIG. 6A, the method at block 602 comprises, at block 612 determining an area of the triangle. If the area of the triangle is within a size threshold, i.e. too small, then block 604 will be followed.

An example method will now be described with respect to FIGS. 7A, 7B, and 8. In some examples, the build data of the prepared 3D print job may comprise one or more build elements that define the texture of a 3D object that is to be generated. For example, the one or more build elements may comprise a texture map, or a texture map portion. For example, the 3D model representing the object may comprise a colour texture map that defines the colours of portions of the object. In another example, the 3D model representing the object may comprise a displacement texture map that defines varying surface positions of portions of the object, for example to create a rough surface or the like. In certain examples, the texture maps are defined in an array of texels that map out the colours, displacements, or other textures, on portions of the object. In some examples, during a voxelization process performed on the build data where the texture definitions are mapped to voxels for use in generating the 3D object layer-by-layer, more than one texel from the texture map may fall inside a voxel because the texture map may have a higher resolution than the resolution of the printing system of the selected additive manufacturing system. Using this voxel map may then produce undefined results in the 3D object because of the information lost in preparing the voxel map, which constitutes a generation defect. For example, the voxel map may define a pattern of a functional agent to be applied to a particular layer of build material, as described herein, and—due to the information loss—the functional agent pattern may not be applied as expected. FIGS. 7A and 7B illustrate an example of a generation defect resulting from a resolution mis-match between a texture map and a printing system of an additive manufacturing system. FIG. 7A shows an example of a texture including some text numbers that may be mapped to a portion of a 3D model representing an object. FIG. 7B shows how the texture is rendered after being mapped onto a portion of a 3D object generated in an additive manufacturing system with a larger printable voxel size. The voxelization process results in an applied texture in which the numbers are distorted, as can be seen in FIG. 7B.

To address this type of generation defect, in certain examples, the property of a texture map, or texture map portion, may be determined. The texture map, for example, may be a UV texture map in which triangular pieces of an image map are mapped to a corresponding triangle defining a portion of the object. The corresponding triangle may be part of a polygonal mesh defining the solid portions of the 3D object, for example. In some examples, UV coordinates are generated from each vertex in the polygonal mesh and the polygonal mesh can be unfolded, or unwrapped, to form a flat surface onto which the image map can be applied, thereby defining a texture map, which has a texture map portion for each triangle of the polygonal mesh. In some examples, a vertex shared by two or more triangles of the mesh may have different UV coordinates for each triangle when unfolded because the mesh may be cut apart to form the flat surface. The UV texture map could be a colour texture map or a displacement texture map, for example. To determine the property of the texture map, or texture map portion, the UV mapping on the vertex coordinates may be analyzed to determine the number of texels that are between the UV coordinates of each edge of a triangle of the polygonal mesh. The number of texels is then compared with the number of print resolution voxels that will be generated when generating that portion of the 3D object. If the number of texels is higher than the number of print resolution voxels, then it is determined, based on the property, that using the build data would result in generating a 3D object with a generation defect. For instance, the property may be considered to not meet a pre-determined configuration. An indication can then be made that the texture map would be the cause of generating the 3D object with a generation defect. In certain examples, the texture map, which has been indicated as being the cause of the generation defect, and, in some examples, at the instigation of a user as explained herein, is adapted so that the texture map does not cause the generation defect in the 3D object. For example, the texture map may be adapted to meet the pre-determined configuration. For example, the build data may be modified by reducing the resolution of the texture map, or by reducing the resolution of the texture map portion. In some examples, where the property of a texture map portion is determined, the resolution of the entire texture map may be reduced. In certain examples, the resolution reduction may be performed using pre-defined reduction techniques such as executing a mipmapping technique. In other examples, a user may manually decide how to reduce the resolution of a texture map.

As illustrated in FIG. 8, the method at block 302 may comprise, in certain examples, at block 802, determining a property of a texture map, or texture map portion. In certain examples, where it is determined, based on the property of the texture map, or the texture map portion, that using the build data would result in generating a 3D object with a generation defect, the method at block 402 comprises, at block 804 indicating that the texture map, or the texture map portion, would be the cause of a generation defect in a 3D object generated by using the build data comprising the texture map. In certain examples, the method at block 408 comprises, at block 806 modifying the build data by adapting the texture map, or the texture map portion. In certain examples, it will be understood that block 806 may involve following blocks 404, 406, 408, and/or 412, as described herein. In some examples, block 806 may involve following block 414, as described herein.

In certain examples, the method at block 802 comprises, at block 808 determining the number of texels that are between UV coordinates of each edge of a triangle of a polygonal mesh. The polygonal mesh may define the solid portions of a 3D object to be generated. The number of texels may then be compared with the number of print resolution voxels that will be generated for building that portion of the 3D object and, if the number of texels is higher than the number of print resolution voxels, then the property is considered to not meet a pre-determined configuration and block 804 will be followed.

An example method will now be described with respect to FIG. 9. In some examples, the build data of the 3D print job may comprise one or more beam lattices. Beam lattices are features in a 3D model that represent lattice structures generated in an object. Lattice structures provide good strength-to-weight ratios, desirable shock and sound absorption, and enable larger surface areas to be generated. The beam lattices may be defined in terms of a network of nodes and beams or struts. For example, the one or more build elements may comprise one or more beams from the beam lattice. In certain file formats, for example the 3MF format, it is permitted to define beams that are shorter than a pre-defined minimum length; however, the standards governing certain file formats require that these shorter beams are to be ignored for 3D object generation. This is not a desirable circumstance because a user of a preparation module or additive manufacturing system may not be aware whether the shorter beams were added to the 3D model intentionally. For example, it may be that the user would expect the shorter beams present in the 3D model to be generated in the 3D object, but, when the build proceeds, the additive manufacturing system does not generate the shorter beams. Using build data comprising one or more beam lattices may therefore generate a 3D object without the presence of the expected beams, which is an undesirable production quality issue and constitutes a generation defect.

To address this type of generation defect, in certain examples, the property of a beam lattice may be determined. For example, a length of one or more beams from the beam lattice may be determined. If the length of the beam is deemed smaller than a given threshold, then it is determined, based on the property, that using the build data would result in generating a 3D object with a generation defect. For instance, the property may be considered to not meet a pre-determined configuration. An indication can then be made that the beam lattice would be the cause of generating the 3D object with a generation defect. In certain examples, the beam of the beam lattice, which has been indicated as being the cause of the generation defect, and, in some examples, at the instigation of a user as explained herein, is adapted so that the beam lattice does not cause the generation defect in the 3D object. For example, the beam lattice may be adapted to meet the pre-determined configuration. For example, the build data may be modified by removing the beam from the beam lattice. In another example, the build data may be modified by making the beam from the beam lattice larger to meet the pre-defined minimum length. In another example, the build data may be modified by modifying the pre-defined minimum length set by the particular file format. In certain examples, the shorter beams may be displayed to a user graphically to allow a decision to be made on whether the shorter beams should be retained in the build data.

As illustrated in FIG. 9, the method at block 302 may comprise, in certain examples, at block 902, determining a property of a beam in a beam lattice. In certain examples, where it is determined, based on the property of the beam, that using the build data would result in generating a 3D object with a generation defect, the method at block 402 comprises, at block 904 indicating that the beam, or the beam lattice, would be the cause of a generation defect in a 3D object generated by using the build data comprising the beam lattice. In certain examples, the method at block 408 comprises, at block 906 modifying the build data by adapting the beam of the beam lattice. In certain examples, it will be understood that block 906 may involve following blocks 404, 406, 408, and/or 412, as described herein. In some examples, block 906 may involve following block 414, as described herein.

In certain examples, the method at block 902 may comprise, at block 908 determining a length of one or more beams from the beam lattice. If the length of the is deemed smaller than a given threshold, then block 904 will be followed.

An example method will now be described with respect to FIG. 10. In some examples, the build data of the 3D print job may comprise more than one triangular polygonal mesh and one or more of the meshes may overlap in the model space representing the build volume. Certain file formats, for example the 3MF format, have standard rules governing how overlapping regions of meshes are to be resolved for object generation. However, in some cases, when the 3D print job is prepared, the overlapping meshes will not have been properly merged into a single polygonal mesh. In such cases, build elements from each of the overlapping meshes within the build data may be optimized for object generation separately, and this can lead to unexpected artifacts being built in the overlapping regions of the build volume. Such artifacts constitute a generation defect. In some examples, where the overlapping regions are small in size, minor changes resulting from the optimization of the overlapping meshes for object generation may even cause overlapping solid regions to be separated from each other in the 3D object. In some other examples, separate polygonal meshes in the 3D print job may have been mistakenly overlapped when the 3D print job was prepared, for example because a user was attempting to maximize the use of space in the build volume. Identifying such overlaps may be useful when preparing the build data for use in the chosen additive manufacturing system.

To address this type of generation defect, in certain examples, the property of a triangle of a first polygonal mesh from a plurality of polygonal meshes may be determined. For example, the triangle of the first polygonal mesh may be analyzed to determine if the triangle intersects with a triangle from a second polygonal mesh from the plurality of polygonal meshes. If an intersection is found, then it is determined, based on the property, that using the build data would result in generating a 3D object with a generation defect. For instance, the property may be considered to not meet a pre-determined configuration. An indication can then be made that the polygonal mesh would be the cause of generating one or more 3D objects with a generation defect. In certain examples, the analyzed triangle of the first polygonal mesh, which has been indicated as being the cause of the generation defect, and, in some examples, at the instigation of a user as explained herein, may be adapted so that the polygonal mesh does not cause the generation defect in the 3D object. For example, the polygonal mesh may be adapted to meet the pre-determined configuration. For example, the build data may be modified by merging the intersecting polygonal meshes to form a single polygonal mesh. For instance, the triangle may be adapted by merging the first polygonal mesh with the second polygonal mesh. In another example, the build data may be modified by translating, rotating, or scaling, one or more of the 3D models in the model space representing the build volume to separate the overlapping polygonal meshes. For instance, the triangle may be adapted by moving or scaling the first polygonal mesh relative to the second polygonal mesh so that they are separated and the triangle no longer intersects with the triangle of the second polygonal mesh. In certain examples, the overlapping polygonal meshes may be displayed to a user graphically to allow a decision to be made on whether to separate or merge the overlapping polygonal meshes.

As illustrated in FIG. 10, the method at block 302 may comprise, in certain examples, at block 1002, determining a property of a triangle of a first polygonal mesh from a plurality of polygonal meshes. In certain examples, where it is determined, based on the property of the triangle, that using the build data would result in generating a 3D object with a generation defect the method at block 402 comprises, at block 1004 indicating that two overlapping polygonal meshes from the plurality of polygonal meshes, would be the cause of a generation defect in one or more 3D objects generated using the build data comprising the plurality of polygonal meshes. In certain examples, the method at block 408 comprises, at block 1006 modifying the build data by adapting the triangle of the first polygonal mesh from the plurality of polygonal meshes. In certain examples, it will be understood that block 1006 may involve following blocks 404, 406, 408, and/or 412, as described herein. In some examples, block 1006 may involve following block 414, as described herein.

In certain examples, the method at block 1002 may comprise, at block 1008 determining if a triangle from a first polygonal mesh from a plurality of polygonal meshes intersects with a triangle from a second polygonal mesh from the plurality of polygonal meshes. If an intersection is found, block 1004 will be followed.

The example method(s) described herein may be performed in any of the example preparation modules and/or additive manufacturing systems described herein and illustrated in any of the figures.

For example, the method(s) described above may be performed in the example preparation module 20 illustrated in FIG. 1. In certain examples, the method(s) described above may be performed in an additive manufacturing system, such as the additive manufacturing system 10 also illustrated in FIG. 1.

In one example, an additive manufacturing system comprises a processor. The additive manufacturing system may comprise a preparation module comprising the processor. The processor may carry out any of the processes or methods described herein or instruct they be carried out in the additive manufacturing system. In certain examples, the additive manufacturing system may comprise a storage medium encoded with executable instructions. The preparation module may comprise the storage medium encoded with executable instructions. The processor may execute the instructions in any suitable order, or simultaneously. The storage medium may be a non-transitory machine-readable storage medium. Any of the example processes or methods described herein may be encoded in machine readable form on the storage medium. In an example, the storage medium may comprise instructions which, when executed by the processor, control the processor to: determine, from build data comprising one or more build elements each of which is a representation of a portion of an object of one or more objects to be generated by an additive manufacturing system, a property of at least one build element of the one or more build elements; and determine, based on the property of the at least one build element, whether generating the one or more objects using the build data would result in generating the object with a generation defect. In certain examples, the additive manufacturing system may comprise one or more processors, for example in addition to those provided with the preparation module. A controller may comprise the one or more processors. The preparation module processor may communicate and cooperate with the controller of the additive manufacturing system, or any of the unit controllers described herein. The non-transitory machine-readable storage medium may be encoded with the other instructions relating to the functioning of the additive manufacturing system.

In certain examples, the additive manufacturing system may comprise a build unit. For example, the additive manufacturing system may comprise a separate, or separable, build unit as described herein. In some examples, the build unit may comprise a controller comprising a processor to control the build unit separately of the additive manufacturing system controller. In some examples, the controller of the additive manufacturing system may cooperate with the controller of the build unit. In certain examples, the additive manufacturing system may comprise a printing system as described herein. For example, the additive manufacturing system may comprise a separate, or separable, printing system as described herein. In some examples, the printing system may comprise a comprise a controller comprising a processor to control the printing system separately of the additive manufacturing system controller. In some examples, the controller of the additive manufacturing system may cooperate with a controller of the printing system. Any of the processors and/or processors described herein may be communicatively connected with one another via communications interfaces, for example, by way of communication cabling, or a wireless communication protocol. Any of the controllers and/or processors described herein may comprise a computer.

In certain examples, any of the controllers and/or processors described herein may be remote from the additive manufacturing system. For example, a controller may be remotely connected to the additive manufacturing system over a network, which would allow the controller and the other features of the additive manufacturing system to be located separately from each other, including the possibility of being separated by large distances. The connection may be a network connection. It will be appreciated that the example blocks described herein may be implemented at various locations across a network. For example, a remote computer may store encoded instructions for performing an example of the methods described herein. A local or terminal computer may access the remote computer and access the encoded instructions. It will be appreciated that the example blocks may be implemented by a dedicated circuit, for example a DSP or a programmable logic array. It will be appreciated that the example blocks described herein may be implemented at various locations throughout the additive manufacturing system, for instance in the preparation module, printing system, or in some cases, in the build unit. As described herein, the additive manufacturing system and the preparation module may be combined into a single unit and the blocks may be implemented in one location.

A non-transitory machine-readable storage medium may be encoded with instructions executable by a processor, for example a processor of a preparation module and/or additive manufacturing system, as described herein. Some examples of non-transitory storage media are disks, thumb drives, memory cards and do not include propagated signals. The storage medium may be supplied separately of the preparation module and/or additive manufacturing system. Any of the example processes or methods described herein may be encoded in machine readable form on the non-transitory storage medium. For example, the example processes or methods above may be in the form of a computer program comprising computer program code. For example, the non-transitory machine-readable storage medium may be encoded with instructions for performing all, or any of, the blocks described herein. In an example, the storage medium may comprise: instructions to determine, from build data comprising one or more build elements each of which is a representation of a portion of an object of one or more objects to be generated by an additive manufacturing system, a property of at least one build element of the one or more build elements; and instructions to determine, based on the property of the at least one build element, whether generating the one or more objects using the build data would result in generating the object with a generation defect. A processor may retrieve and execute the encoded instructions and perform any of the blocks described herein or instruct another device, such as a build unit or printing system, to perform any of the blocks described herein. The processor may retrieve and execute encoded instructions and perform additional blocks relating to other functions of an additive manufacturing system. The processor may execute the instructions such that they may be carried out in any suitable order, or simultaneously.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
   determining, by a processor and from build data comprising one or more build elements that are each a representation of a portion of an object of one or more objects to be generated by an additive manufacturing apparatus, a property of at least one build element of the one or more build elements;
   determining, by a processor and based on the property of the at least one build element, whether generating the one or more objects by the additive manufacturing apparatus using the build data would result in generating the object with a generation defect;
   in response to determining that generating the one or more objects would result a generation defect when generating the object, automatically modifying, by the processor, the build data so that the generation defect would not result when generating the object; and
   causing, by the processor, the additive manufactured apparatus to generate the one or more objects according to the modified build data, wherein in a first case, the at least one build element comprises a triangle of a polygonal mesh, determining that generating the one or more objects would result in the generation defect comprises determining that a face of the triangle spans more than one voxel in a Z-direction based on a normal direction of the face, and automatically modifying the build data so that the generation defect would not result comprises flattening the triangle so that the face does not span more than one voxel in the Z-direction, wherein in a second case, the at least one build element comprises a displacement map, determining that generating the one or more objects would result in the generation defect comprises determining that a number of texels between UV coordinates of each edge of a triangle of a polygonal mesh of the displacement map is greater than a number of print resolution voxels, and automatically modifying the build data so that the generation defect would not result comprises reducing a resolution of the displacement map so that the number of texels between the UV coordinates of each edge of the triangle of the polygonal mesh is not greater than the number of print resolution voxels wherein in a third case, the at least one build element comprises a beam in a beam lattice, determining that generating the one or more objects would result in the generation defect comprises determining that a length of the beam is less than a minimum required length, and automatically modifying the build data so that the generation defect would not result comprises increasing the length to the minimum required length, wherein in a fourth case, the at least one build element comprises first and second triangles of first and second polygonal meshes of first and second objects, respectively, determining that generating the one or more objects would result in the generation defect comprises determining that the first and second triangles intersect, and automatically modifying the build data so that the generation defect would not result comprises merging the first and second objects into a single object.

2. The method of claim 1, wherein at least the first case is true.

3. The method of claim 1, wherein at least the second case is true.

4. The method of claim 1, wherein at least the third case is true.

5. The method of claim 1, wherein at least the fourth case is true.

6. A non-transitory machine-readable medium storing instructions executable by a processor to perform processing comprising:

determining, from build data comprising one or more build elements that are each a representation of a portion of an object of one or more objects to be generated by an additive manufacturing apparatus, a property of at least one build element of the one or more build elements;

determining, based on the property of the at least one build element, whether generating the one or more objects by the additive manufacturing apparatus using the build data would result in generating the object with a generation defect;

in response to determining that generating the one or more objects would result a generation defect when generating the object, automatically modifying the build data so that the generation defect would not result when generating the object; and causing the additive manufactured apparatus to generate the one or more objects according to the modified build data, wherein in a first case, the at least one build element comprises a triangle of a polygonal mesh, determining that generating the one or more objects would result in the generation defect comprises determining that a face of the triangle spans more than one voxel in a Z-direction based on a normal direction of the face, and automatically modifying the build data so that the generation defect would not result comprises flattening the triangle so that the face does not span more than one voxel in the Z-direction, wherein in a second case, the at least one build element comprises a displacement map, determining that generating the one or more objects would result in the generation defect comprises determining that a number of texels between UV coordinates of each edge of a triangle of a polygonal mesh of the displacement map is greater than a number of print resolution voxels, and automatically modifying the build data so that the generation defect would not result comprises reducing a resolution of the displacement map so that the number of texels between the UV coordinates of each edge of the triangle of the polygonal mesh is not greater than the number of print resolution voxels, wherein in a third case, the at least one build element comprises a beam in a beam lattice, determining that generating the one or more objects would result in the generation defect comprises determining that a length of the beam is less than a minimum required length, and automatically modifying the build data so that the generation defect would not result comprises increasing the length to the minimum required length, wherein in a fourth case, the at least one build element comprises first and second triangles of first and second polygonal meshes of first and second objects, respectively, determining that generating the one or more objects would result in the generation defect comprises determining that the first and second triangles intersect, and automatically modifying the build data so that the generation defect would not result comprises merging the first and second objects into a single object.

7. The non-transitory machine-readable medium of claim 6, wherein at least the first case is true.

8. The non-transitory machine-readable medium of claim 6, wherein at least the second case is true.

9. The non-transitory machine-readable medium of claim 6, wherein at least the third case is true.

10. The non-transitory machine-readable medium of claim 6, wherein at least the fourth case is true.

11. A system comprising:

a processor; and a non-transitory machine-readable medium storing instructions executable by the processor to perform processing comprising:

determining, from build data comprising one or more build elements that are each a representation of a portion of an object of one or more objects to be generated by an additive manufacturing apparatus, a property of at least one build element of the one or more build elements;

determining, based on the property of the at least one build element, whether generating the one or more objects by the additive manufacturing apparatus using the build data would result in generating the object with a generation defect;

in response to determining that generating the one or more objects would result a generation defect when generating the object, automatically modifying the build data so that the generation defect would not result when generating the object; and causing the additive manufactured apparatus to generate the one or more objects according to the modified build data, wherein in a first case, the at least one build element comprises a triangle of a polygonal mesh, determining that generating the one or more objects would result in the generation defect comprises determining that a face of the triangle spans more than one voxel in a Z-direction based on a normal direction of the face, and automatically modifying the build data so that the generation defect would not result comprises flattening the triangle so that the face does not span more than one voxel in the Z-direction, wherein in a second case, the at least one build element comprises a displacement map, determining that generating the one or more objects would result in the generation defect comprises determining that a number of texels between UV coordinates of each edge of a triangle of a polygonal mesh of the displacement map is greater than a number of print resolution voxels, and automatically modifying the build data so that the generation defect would not result comprises reducing a resolution of the displacement map so that the number of texels between the UV coordinates of each edge of the triangle of the polygonal mesh is not greater than the number of print resolution voxels, wherein in a third case, the at least one build element comprises a beam in a beam lattice, determining that generating the one or more objects would result in the generation defect comprises determining that a length of the beam is less than a minimum required length, and automatically modifying the build data so that the generation defect would not result comprises increasing the length to the minimum required length, wherein in a fourth case, the at least one build element comprises first and second triangles of first and second polygonal meshes of first and second objects, respectively, determining that generating the one or more objects would result in the generation defect comprises determining that the first and second triangles intersect, and automatically modifying the build data so that the generation defect would not result comprises merging the first and second objects into a single object.

12. The system of claim 11, wherein at least the first case is true.

13. The system of claim 11, wherein at least the second case is true.

14. The system of claim 11, wherein at least the third case is true.

15. The system of claim 11, wherein at least the fourth case is true.

\* \* \* \* \*